United States Patent
Rajaram et al.

(10) Patent No.: US 11,451,563 B2
(45) Date of Patent: Sep. 20, 2022

(54) DYNAMIC DETECTION OF HTTP-BASED DDOS ATTACKS USING ESTIMATED CARDINALITY

(71) Applicant: Arbor Networks, Inc., Westford, MA (US)

(72) Inventors: Archana A. Rajaram, Ann Arbor, MI (US); Andrew David Mortensen, Ann Arbor, MI (US)

(73) Assignee: Arbor Networks, Inc., Westford, MA (US)

( * ) Notice: Subject to any disclaimer, the term of this patent is extended or adjusted under 35 U.S.C. 154(b) by 232 days.

(21) Appl. No.: 16/884,979

(22) Filed: May 27, 2020

(65) Prior Publication Data

US 2021/0120015 A1 Apr. 22, 2021

Related U.S. Application Data

(60) Provisional application No. 62/916,641, filed on Oct. 17, 2019.

(51) Int. Cl.
*H04L 9/40* (2022.01)

(52) U.S. Cl.
CPC ...... *H04L 63/1416* (2013.01); *H04L 63/1458* (2013.01)

(58) Field of Classification Search
CPC .......... H04L 63/1416; H04L 63/1458
See application file for complete search history.

(56) References Cited

U.S. PATENT DOCUMENTS

| | | | |
|---|---|---|---|
| 10,027,694 B1* | 7/2018 | Gupta | H04L 63/1458 |
| 10,270,794 B1* | 4/2019 | Mukerji | H04L 63/1425 |
| 10,608,992 B2* | 3/2020 | Jain | H04L 63/1441 |
| 10,708,294 B2* | 7/2020 | Northway, Jr. | H04L 63/0227 |
| 11,012,414 B2* | 5/2021 | Moore | H04L 63/20 |
| 11,153,342 B2* | 10/2021 | Adams | H04L 63/1425 |
| 2017/0250953 A1* | 8/2017 | Jain | G06F 21/577 |
| 2018/0152474 A1* | 5/2018 | Winquist | H04L 43/04 |
| 2018/0205750 A1* | 7/2018 | Kohout | G06F 21/554 |
| 2018/0241762 A1* | 8/2018 | Savalle | G06N 3/006 |
| 2018/0248908 A1* | 8/2018 | Bjarnason | H04L 63/1458 |
| 2019/0014084 A1* | 1/2019 | Jain | H04L 63/1441 |
| 2019/0020680 A1* | 1/2019 | Khalimonenko | H04L 67/025 |
| 2019/0068624 A1* | 2/2019 | Compton | H04L 63/1441 |
| 2020/0137112 A1* | 4/2020 | Compton | H04L 63/1491 |

(Continued)

*Primary Examiner* — Joseph P Hirl
*Assistant Examiner* — Stephen T Gundry
(74) *Attorney, Agent, or Firm* — Locke Lord LLP; Scott D. Wofsy; Christopher J. Capelli

(57) ABSTRACT

A computer method and system for detecting a Denial of Service (DoS) attack by detecting changes in recent cardinality of a network traffic flow. Packet traffic flows are received from external device (networks), and a cardinality estimation is then performed on a received packet traffic flow. A series of cardinalities is maintained for prior packet traffic flows. Changes in cardinalities associated with prior packet traffic flows are detected when compared to cardinalities of a current packet traffic flow. An alert condition for the network traffic flow is generated regarding a suspected DoS attack based upon the detected changes in cardinalities regarding comparison of the cardinalities associated with prior packet traffic flows compared to cardinalities of a current packet traffic flow.

11 Claims, 5 Drawing Sheets

(56) References Cited

U.S. PATENT DOCUMENTS

| | | | |
|---|---|---|---|
| 2020/0259860 A1* | 8/2020 | Adams | H04L 63/1408 |
| 2020/0329054 A1* | 10/2020 | Bjarnason | H04L 63/205 |
| 2020/0351244 A1* | 11/2020 | Moore | H04L 61/1511 |
| 2020/0412750 A1* | 12/2020 | Doron | H04L 63/1458 |
| 2021/0099482 A1* | 4/2021 | Doron | H04L 63/1408 |
| 2021/0112091 A1* | 4/2021 | Compton | H04L 63/1425 |
| 2021/0120032 A1* | 4/2021 | St. Pierre | H04L 63/1416 |

* cited by examiner

B_Bit 1 Position, $T_i$ —Time the packet was received.

DYNAMIC DETECTION OF HTTP-BASED DDOS ATTACKS USING ESTIMATED CARDINALITY

CROSS REFERENCE TO RELATED APPLICATIONS

This application claims priority to U.S. Patent Application Ser. No. 62/916,641 which is incorporated herein by reference in its entirety.

FIELD OF THE INVENTION

The invention relates in general to Internet security and in particular to detection of denial of service (DoS) attacks and distributed denial of service (DDoS) attacks, and more particularly to detecting changes in recent cardinality associated with network traffic flows for detecting DDoS attacks.

BACKGROUND OF THE INVENTION

In recent years, denial of service (DoS) attacks and distributed denial of service (DDoS) attack has become a major security threat to Internet service. A DoS attack and DDoS attack can completely consume the resources of a server, which will be unable to provide services for legitimate users. With the exponential increase of Internet-based e-business and e-commence, the damage of DoS attacks and DDoS attacks is becoming more and more significant. Therefore, how to handle DoS attacks and DDoS attacks and protect the access of legitimate users has become a crucial challenge and has attracted the attention of both the industry and academia.

Due to the readily available tools and its simple nature, flooding packets is the most common and effective DoS attack. While flooding tools have been become more sophisticated, they have been getting easier to use. An adversary without much knowledge of programming can download a flooding tool and then launch a DoS attack. The flooding traffic of a DoS attack may originate from either a single source or multiple sources. We call the latter case a distributed denial of service (DDoS) attack. Briefly, a DDoS attack works as follows. An attacker sends control packets to the previously-compromised flooding sources, instructing them to target at a given victim. The flooding sources then collectively generate and send an excessive number of flooding packets to the victim, but with fake and randomized source addresses, so that the victim cannot locate the flooding sources.

To prevent DoS attacks, researchers have designed and implemented a number of countermeasures. In general, the countermeasures of DoS attacks can be classified into three different categories: detection, defense (or mitigation), and IP trace-back mechanisms. Detecting DoS attacks in real time is the first step of combating DoS attacks. An automated and fast detection is essential to the protection against DoS attacks. Upon timely detection of a DoS attack, more sophisticated defense mechanisms will be triggered to shield victim servers or link bandwidth from DoS traffic, and block the prorogation of DDoS traffic at routers. At the same time, more expensive IP trace-back to single out flooding sources is performed. Unlike defense and trace-back mechanisms, detection itself should be an always-on function with little overhead, causing minimal disruption to normal operations and withstanding any flooding attacks. Basically, detecting DoS attacks belongs to network-based intrusion detection. A network-based intrusion detection system (NIDS) is based on the idea that an intruder's behavior will be noticeably different from that of a legitimate user and that many unauthorized actions are detectable. A commonly used detection approach is either signature-based or anomaly-based. A signature-based NIDS inspects the passing traffic and searches for matches against already-known malicious patterns. A key advantage of signature-based detection algorithms is their high degree of accuracy in detecting known attacks and their variations. Their obvious drawback is the inability to detect attacks whose instances have not yet been observed.

Anomaly detection approaches, on the other hand, build models of normal data and detect deviations from the normal model in observed data. Anomaly detection have the advantage that they can detect new types of attacks as deviations from normal usage. However, current anomaly detection schemes suffer from a high rate of false alarms. This occurs primarily because previously unseen (yet legitimate) system behaviors are also recognized as anomalies, and hence flagged as potential attacks.

Moreover anomaly detection algorithms need to be adaptive, which means they must be able to cope with constantly changing network conditions. Therefore, sophisticated traffic analysis is required to manage the strong non-stationary behavior of normal Internet traffic and at the same time distinguish between natural variations in traffic profiles, such as changed usage patterns between day and night, week-days and weekend or a flash-crowd to a web-site, and truly anomalous traffic variations, such as DDoS attacks. Second, the algorithms need to show a good trade-off between false positive/negative ratio and detection lag (time interval between the time at which the attack starts and the time at which the anomaly is detected). Third, the algorithms need to be computationally simple because of the multi-Gigabit per second (Gbps) links used by most of the carriers today and limited memory usage for on-fly information storage. Forth, the algorithms should detect both low and high-volume attacks. Current detection algorithms typically process high-volume attacks but their performance degrades severely as soon as the attacks rate drops below a specific threshold becoming almost undistinguishable with "Internet noise". To gain a thorough picture of the overall traffic in a network, it is important for an adaptive anomaly detection solution to see the complete traffic profiles. Therefore, to handle the typical large, distributed networks of carriers and service providers, anomaly detection solutions need to be deployable such that a large number of links must be monitored in a cost-effective, yet scalable manner. Moreover, in order to detect low-volume attacks, the algorithm must extract and correlate a few key features that represent sufficiently well normal traffic behavior such to guarantee a fast and efficient detection of anomalies in their infancy stage.

It is to be further appreciated that a number of unique items or attributes in a stream of network traffic may be analyzed to detect hidden characteristics present in that network traffic. Since maintaining exact counts of unique items, or cardinality, in an unbounded network traffic stream is infeasible when processing network traffic on a scale typically handled by service providers—estimating algorithms is preferably utilized to provide a reasonably accurate measure of the cardinality of the network traffic. It is to be appreciated, and in accordance with the illustrated embodiments, this estimated cardinality can in turn be used to detect sudden changes in the profile of the network traffic, enabling dynamic detection of the certain classes of HTTP DDoS attacks.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, it is to be understood that certain types of HTTP request flooding permute the parameters of the requested resource continuously with random values, which often evades simple request filtering. To obviate this occurrence, the method and system of the illustrated embodiments preferably maintains a series of recent, overlapping cardinalities of different specific or combined attributes of recently received packets present in a network data traffic stream. This series of cardinalities is utilized to represent a profile of the recently received network traffic.

In a further aspect of the illustrated embodiments, discussed is a computer method and system for detecting a DoS attack by detecting changes in recent cardinality values associated with captured network traffic flow. Packet traffic flows are intercepted/captured from one or more external devices (via one or more networks) such that a cardinality estimation is performed on the received packet traffic flow. A series of cardinalities is maintained for prior packet traffic flows. Changes in cardinalities associated with prior packet traffic flows are detected when compared to cardinalities of a current packet traffic flow. An alert condition for the network traffic flow is generated regarding a suspected denial of service attack based upon the detected changes in cardinalities regarding comparison of the cardinalities associated with prior packet traffic flows compared to cardinalities of a current packet traffic flow.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
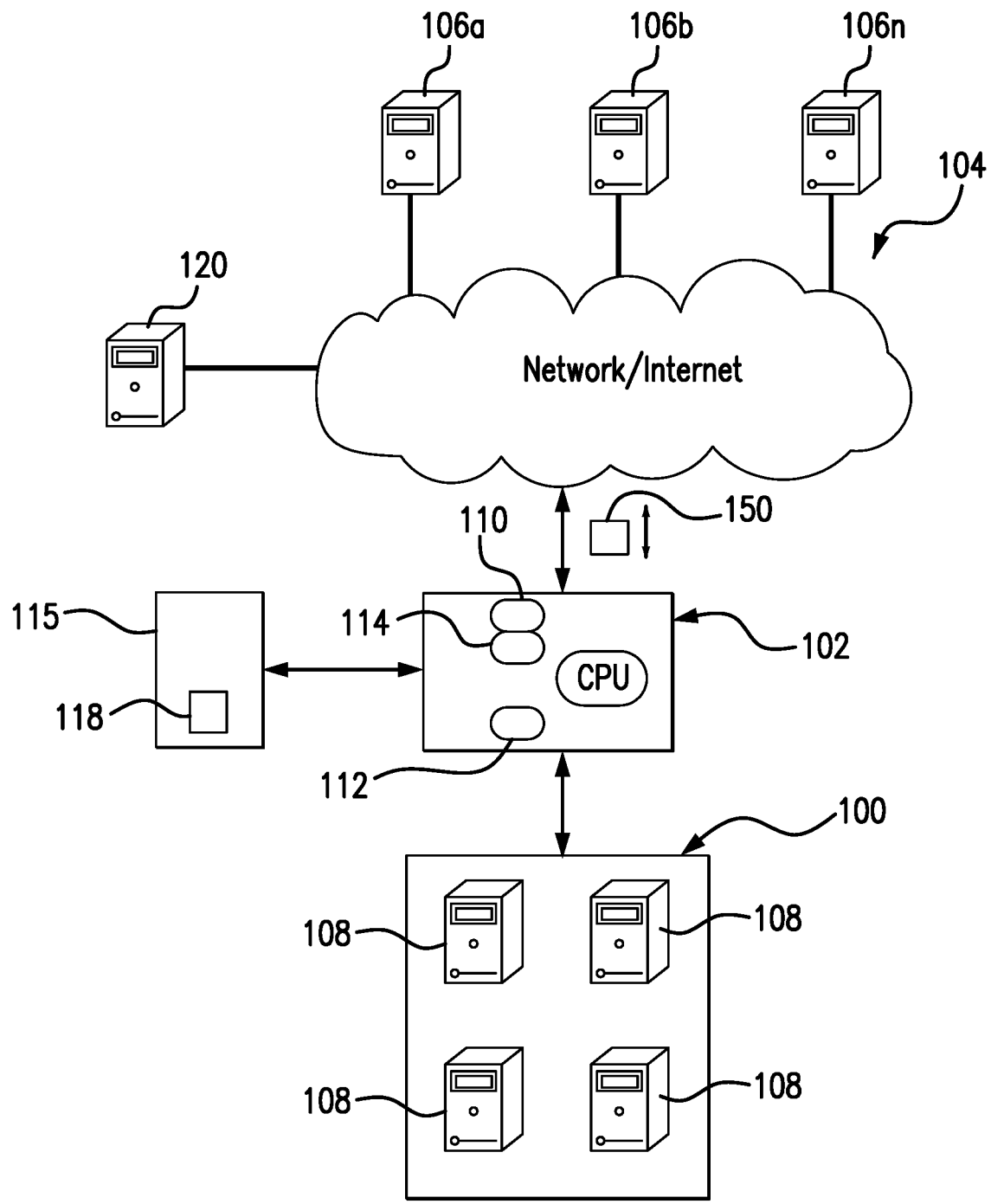
FIG. 1 is a schematic diagram showing network architecture and the relationship between an attack mitigation device and protected network according to one embodiment of the present invention.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

It is to be further understood the illustrated embodiments of the present invention describe a system, apparatus and method for avoiding and mitigating the harmful effects of a DDoS attack on a computer system/device or network, preferably by detecting sudden changes in network traffic by determining the estimated cardinality of network traffic so as to enable dynamic detection of DDoS attacks.

Turning now descriptively to the drawings, in which similar reference characters denote similar elements throughout the several views, and in accordance with the illustrated embodiments, FIG. 1 illustrates the relationship between the protected network 100, attack mitigation device 102, Internet 104, and external host devices 106a-106n, 120.

In a typical implementation, the external host devices 106a-106n, 120 (also referred to as external devices or host devices) attempt to connect to protected devices 108 within the protected network 100 typically via a private network or a public computer network such as the Internet 104. Examples of external host devices include servers, laptops, desktop computers, tablet devices, mobile phones, mobile computing devices, video games systems, televisions and other similar devices and systems having Internet connectivity.

In a preferred embodiment, the protected network 100 is protected by the attack mitigation device 102 preferably located between the Internet 104 and the protected network 100. Usually, the protected network 100 is an enterprise network, such as a school network, business network, and government network, to list a few examples. In other embodiments, the attack mitigation device 102 is located within the Internet, service provider network or enterprise network rather than as a network edge as illustrated in FIG. 1. It is to be appreciated that when deployed within the protected network, traffic 150 is diverted to the mitigation device 102.

The mitigation device 102 preferably includes a packet processing system preferably having an external high-speed network interface 110 and a protected high-speed network interface 112 for intercepting and processing network traffic flows (e.g., data packets)(150) from one or more external networks (e.g., 104). Under current technology, these interfaces are capable of handling 1.0-100 Gbps, for example. The mitigation device 102 may further include processors 114 that preferably processes captured packets 150 intercepted from the network 104 (preferably received at interfaces 110 and 112 from external network 104). Additionally, a central processing unit (CPU), random access memory (RAM), and a storage medium 116 are preferably used to further support the processing of the captured packets 150, as described in detail below in conjunction with FIG. 3. The storage medium 116 also preferably stores calculated cardinalities regarding packets 150 captured from an external network (e.g., the Internet) 104.

In a typical implementation, the mitigation device 102 preferably authenticates all external host devices 106a-106n, 120 before allowing the external devices to access the protected devices 108 within the protected network 100.

In describing the illustrated embodiments, it is to be appreciated that detection of changes in recent cardinality for packets in captured network traffic 150 significantly mitigates/obviates the need for conventional static threshold-based detection techniques, as well as baselining techniques, for purposes of detecting DDoS attacks. It is to be understood that such static threshold techniques requires prior knowledge of "normal" network profiles for a device or network link, and baselining techniques is typically an automated method to determine an understanding of what a "normal" traffic profile is. However, it is noted this disadvantageously often required prolonged training time periods, which is often problematic when attempting to consider seasonality of recently received network traffic.

In contrast, the system and method of the illustrated embodiments provide a dynamic method of threat detection based upon determining anomalies in recent overlapping cardinalities attributable to recently received network traffic 150. This enables a rapid determination for constructing an understanding of normal traffic behavior over a recent (e.g., prescribed) time period. Thus, since a profile of recent, overlapping cardinalities is maintained, the system and method of the illustrated embodiments is significantly less susceptible to the aforesaid problems associated with utilizing the aforementioned baselining and/or static threshold techniques.

In accordance with the illustrated embodiments, to protect against DDoS attacks, the mitigation device 102 is configured and operative to distinguish between requests from legitimate hosts (e.g., 106a-106n) and DDoS attack traffic from an attacking host(s) (e.g., 120). This is preferably accomplished using an analysis procedure that detects changes in packets received 150 from an external network (e.g., 104) by utilizing a Sliding HyperLogLog algorithm to determine the cardinality of certain classes of HTTP traffic present in the received packets 150, preferably at any given time, so as to maintain a series of cardinalities for a prescribed recent time period (as preferably stored in storage medium (e.g., 116).

Figure 2:
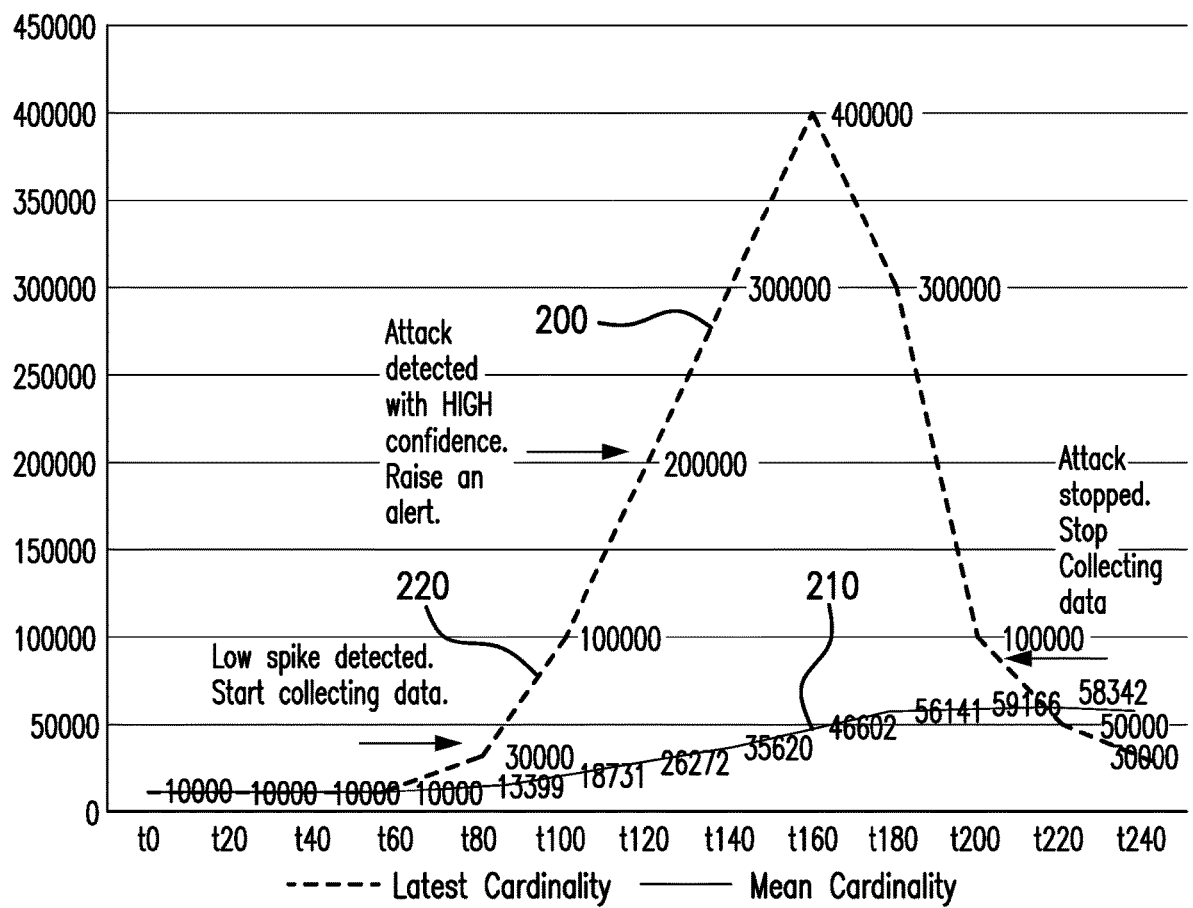
FIGS. 2-4 illustrate operation of mitigation device in accordance with the illustrated embodiments including operation of a change detector in accordance with a cardinality process utilized by a mitigation device in accordance with the illustrated embodiments.
Figure 3:
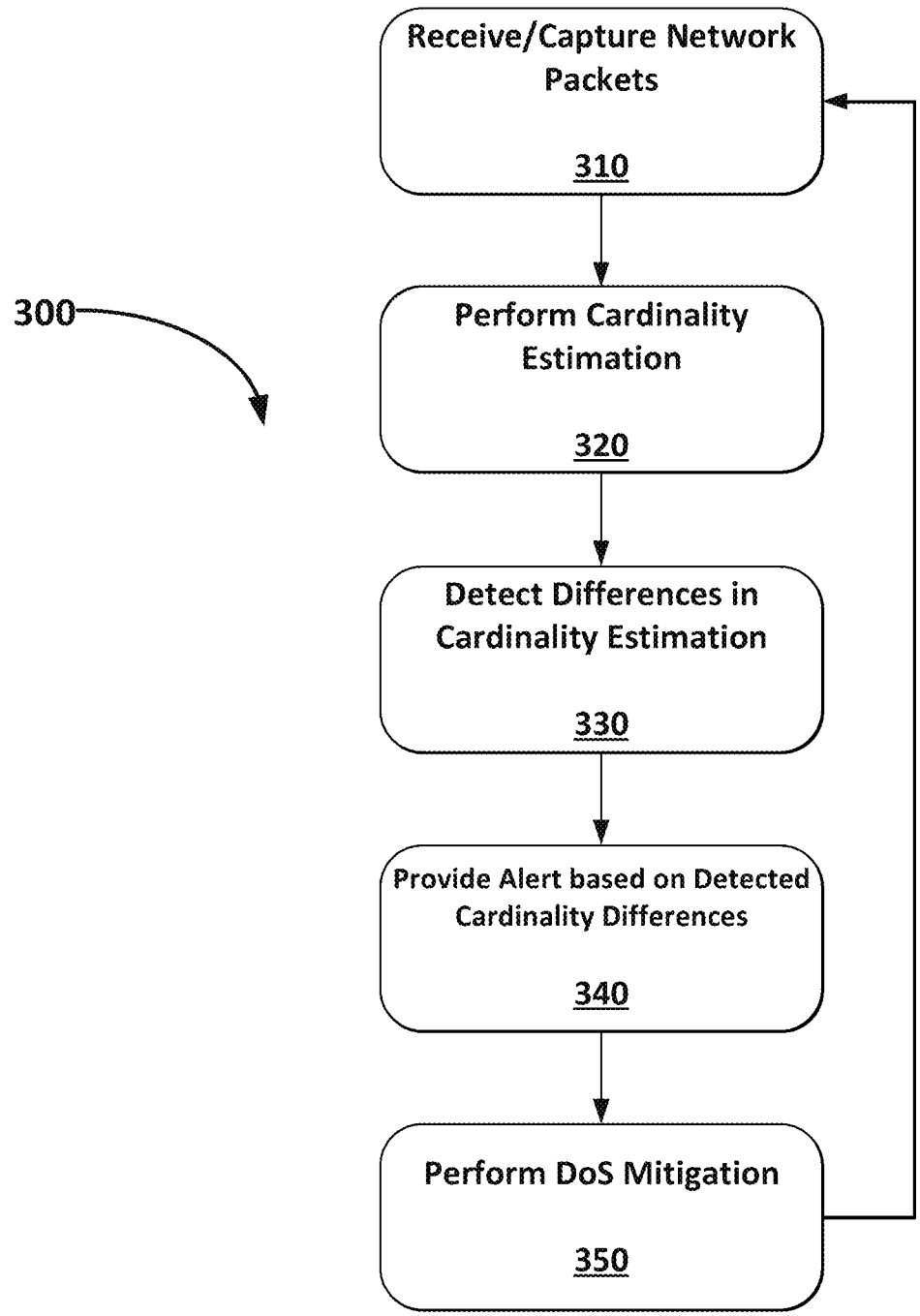
Figure 4:
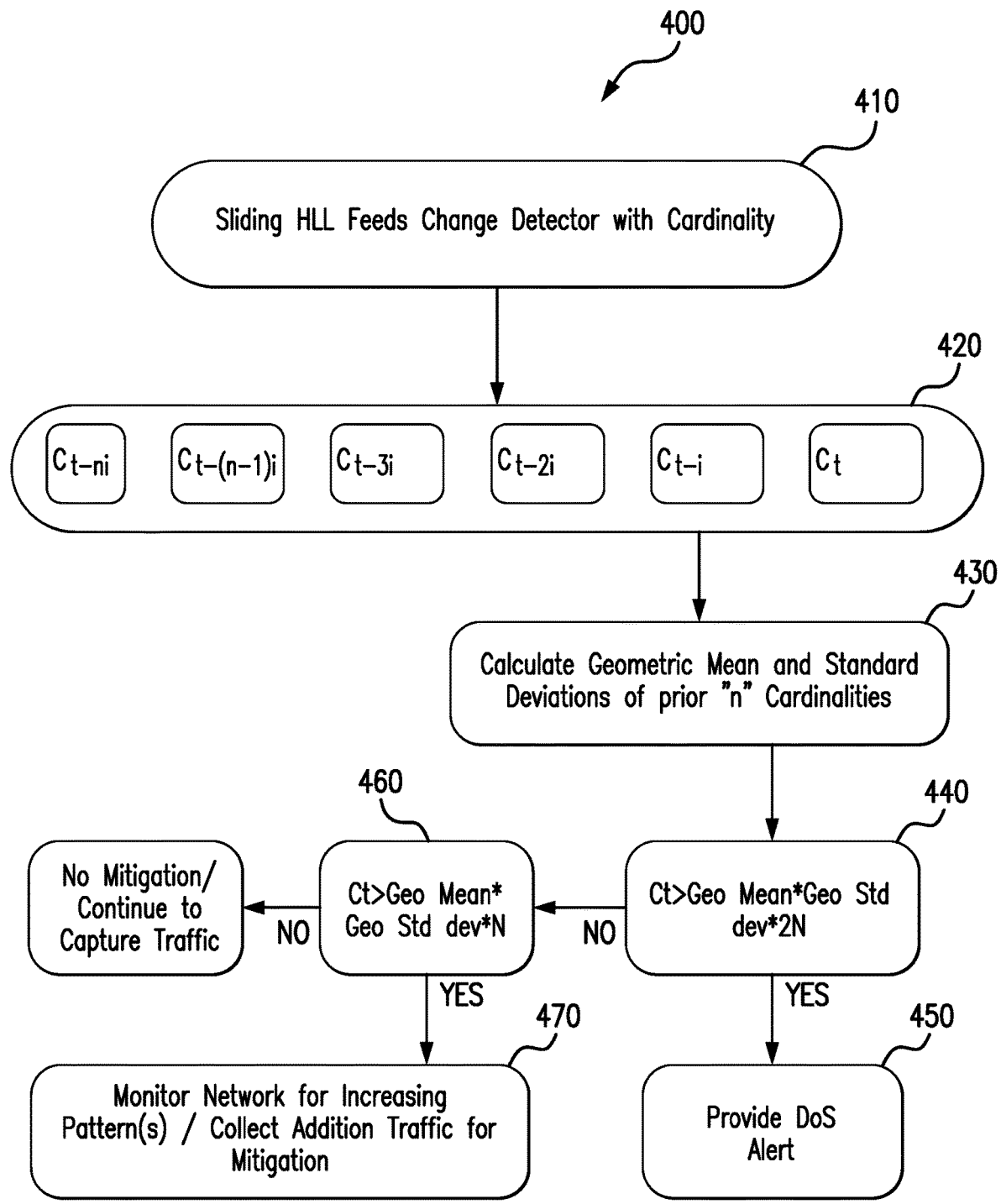

With reference now to FIGS. 2-4 (and with continuing reference to FIG. 1), an exemplary method of operation for the mitigation device 102 in accordance with the illustrated embodiments is provided. It is noted FIG. 2 depicts an exemplary screen display graphically indicating operation of the below described mitigation process using cardinality techniques as exemplary depicted in FIGS. 3 and 4.

Starting at step 310, network traffic 150 flowing from an external network 104 having packets of data (originating from an external source (e.g., 106a-106n, 120) is intercepted and received, and thereafter captured in the mitigation device 102. Once received, the mitigation device 102 is configured and operable to perform a cardinality change detection process on the captured data packets 150, preferably utilizing a Sliding HyperLogLog algorithm, to determine the cardinality of certain classes of HTTP traffic at any given time present in the captured packets 150 received from an external network 104 (step 320)(410, 420). It is to be understood the Sliding HyperLogLog is preferably HyperLogLog (HLL) algorithm having a sliding window (as discussed further below). It is to be further understood that during this process the determined cardinality of certain classes of HTTP traffic present in the received packets 150 at given (prescribed) times are preferably stored in one or more storage mediums 116, preferably associated with the mitigation device 102, so as to maintain a series of cardinalities for a prescribed recent time period.

Next, step 320, the mitigation device 102 is preferably operative and configured to initiate change detector logic which analyzes past cardinalities (e.g., from captured packets stored in storage medium 116 associated with a prior time period), preferably in prescribed regular time intervals, which are then compared with a current cardinality associated with data packets 150 currently being received in the mitigation device 102 from an external network 104 (430). Continuing with description of its change detector functionality, the mitigation device 102 is further configured and operable such that if the current determined cardinality (step 320) (200, FIG. 2) associated with packets 150 being currently received from an external network 104 is greater than a calculated geometric mean cardinality of past cardinality values (e.g., from captured packets stored in storage medium 116 associated with a prior time period), preferably by a 'n' geometric standard deviation of cardinalities (210) (440), then the protection system 102 preferably enters a "Raise Alert" state (220)(450) whereby it is now operable and configured to more definitively (e.g., with finer granularity) monitor received packets 150 from an external network 104 for detecting anomalies and/or a denial of service attack (e.g., a DDoS attack) (step 340). Next, step 350, the protection device 102 is further configured and operable such that if the current determined cardinality associated with packets 150 being currently received from an external network 104 is greater than a calculated geometric mean cardinality of past cardinality values (e.g., as stored in storage medium 116 by a '2n' geometric standard deviation of cardinalities (460), then the protection device 102 enters a "mitigation mode" to perform active steps for preventing a DoS attack upon a protected network 100 by performing appropriate mitigation steps upon the traffic flow 150 received from the external network (step 350)(470). It is to be appreciated such mitigation actions which may be performed may include, but are not limited to, rate-limiting the traffic 150, discarding packets from the traffic 150, either randomly or in some defined manner, and/or performing deep packet inspection (DPI) on all or a subset of the packets constituting the malicious traffic flow 150.

With specific regards to the protection device 102 being configured and operable to perform a cardinality change detection process on the received data packets utilizing a Sliding HyperLogLog algorithm to determine the cardinality of certain classes of HTTP traffic at any given time present in packets 150 received from an external network 104 (step 320), in accordance with certain illustrated embodiments, it is to be appreciated the HyperLogLog is defined such that it preferably utilizes the position of the leftmost 1 bit in a binary string to evaluate cardinality of a data set, such that 'N' leading zeroes in a string->$2^N$ estimated cardinality of the set. Thus, the larger the value of 'N', the larger the cardinality. It is to be further appreciated that the error rate in cardinality is preferably minimized by using a stochastic averaging process of splitting the input into multiple substrings or using multiple registers in HyperLogLog (HLL). For illustrative purposes, an exemplary process for performing a cardinality change detection process is shown via the depicted process 400 of FIG. 4 (Ct–Current Cardinality, and t, t–i, t–2i, t–3i . . . t–(n–1)i, t–ni–Past 'n' timestamps at an interval of 'i').

Figure 5:
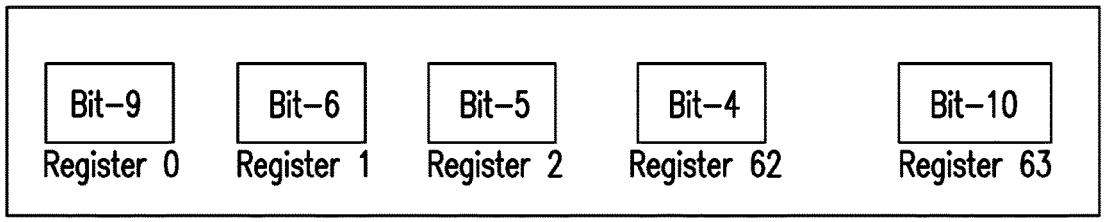
FIG. 5 depicts a bit register in accordance with an illustrative example.

With reference now to FIG. 5, and with regards to an illustrated example for an input string "attackdetection.html", whereby the first 'n' bytes are used for register indexing and 'n' depends on the number of registers. As indicated below in accordance with the illustrated example, 6 bytes are used for register index, for a max of 63 registers:

Input String—"attackdetection.html"
hv=HASH("attackdetection.html")->Randomization
hv=0b000010000001001000101000100101 wherein for the bits "000010" (succeeding the initial bits 0B) the Register Index—2, and for the succeeding 6 bits "000001" the Bit 1 Position—5, With regards to the aforesaid multiple registers in HyperLogLog whereby the error rate in cardinality is minimized by using a stochastic averaging process of splitting the input into multiple substrings, it is to be appreciated that the harmonic mean of pow(2, b) of 'm' registers is:

$$\frac{(pow(2, b_0)^{-1} + pow(2, b_1)^{-1} + pow(2, b_2)^{-1} + \ldots pow(2, b_m)^{-1})}{m^{-1}}$$

whereby Cardinality=m*alpha(m)*m/(pow(2, b0)–1+pow(2,b1)–1+ . . . pow(2,bm)–1)

Figure 6:
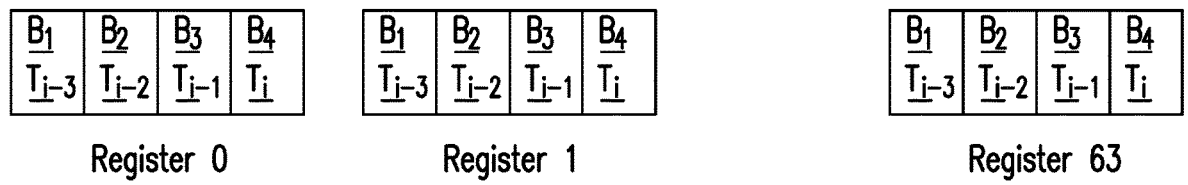
FIG. 6 depicts a bit register in accordance with an illustrative example using a HyperLogLog (HLL) algorithm.

With specific regards to the mitigation device 102 being configured and operable to perform a cardinality change detection process on the received data packets utilizing a Sliding HyperLogLog (HLL) algorithm to determine the cardinality of certain classes of HTTP traffic, and with reference to FIG. 6 it is to be appreciated that the HyperLogLog algorithm is utilized in a network stream such that additional time data is maintained so as to estimate the cardinality of a specific pattern seen over last T time. Hence, the aforesaid sliding HyperLogLog implementation maintains a list of registers where each register consists of a short list of pair of {bit 1 position, time the pkt was received}. It is noted that the arithmetic mean of the bit 1 positions from each small window is used as bit position from the register to calculate the cardinality. It is to be appreciated, in accordance with the illustrated embodiments, Cardinality calculation is done in the same way as Regular HyperLogLog.

In accordance with the above description, it is to be appreciated the mitigation device 102 of the illustrated embodiments provides rapid processing for analyzing network traffic 150 for detecting DoS type attacks while providing reduction of false positives relative to prior art attempts. The illustrated embodiments of the mitigation device enable automation of DoS detection while requiring no prior knowledge of network history required through utilization of recent estimated cardinalities for mitigation denial of service attacks upon a network 100.

It is to be appreciated the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the Figures illustrate exemplary architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer method for detecting a Denial of Service (DoS) attack by detecting changes in recent cardinality of a network traffic flow, the method comprising:
   receiving packets in a traffic flow;
   performing cardinality estimation on the received packet traffic flow using a sliding HyperLogLog (HLL) process that determines a cardinality of defined classes of HTTP traffic at a prescribed time period regarding the received packet traffic flows;
   maintaining a series of cardinalities for prior packet traffic flows;
   detecting changes in cardinalities associated with prior packet traffic flows compared to determined cardinalities of a current packet traffic flow; and
   determining an alert condition for the network traffic flow regarding a suspected DoS attack based upon the detected changes in cardinalities regarding comparison of the determined cardinalities associated with prior packet traffic flows compared to determined cardinalities of a current packet traffic flow and if a determined cardinality associated with packet traffic flows currently received is greater than a calculated geometric mean cardinality of past cardinality values by a prescribed 'n' geometric standard deviation of cardinalities.

2. The method of claim 1, wherein the HLL process includes a sliding window process.

3. The method of claim 1, wherein determining an alert condition further includes
   causing a mitigation system operable to monitor received packets to enter a first state for determining a DoS attack when packet traffic flows currently received has determined cardinality values determined greater than a calculated geometric mean cardinality of past cardinality values by a 'n' geometric standard deviation of cardinalities.

4. The method of claim 3, wherein determining an alert condition further includes:
   determining if the determined cardinality values associated with packet traffic flows currently received is greater than a calculated geometric mean cardinality of past cardinality values by a '2n' geometric standard deviation of cardinalities; and
   causing the mitigation system to enter a second state operable to conduct predefined mitigation actions to prevent a DoS attack when packet traffic flows currently received is determined greater than a calculated geometric mean cardinality of past cardinality values by a prescribed '2n' geometric standard deviation of cardinalities.

5. The method of claim 4, wherein the mitigation actions to prevent a DoS attack includes at least one of: rate-limiting the traffic; discarding packets from the traffic; and
   performing deep packet inspection (DPI) regarding the received packets.

6. The method of claim 1 wherein the Sliding HLL process determines a cardinality of defined classes of HTTP traffic at a prescribed time period regarding the received packet traffic flows.

7. A monitoring system for detecting a Denial of Service (DoS) attack by detecting changes in recent cardinality of a network traffic flow comprising:
   a monitored network comprising a plurality of devices;
   a storage repository for storing network traffic flow information; and
   one or more network monitoring devices communicatively coupled to the monitored network and to the storage repository, wherein the one or more network monitoring devices are configured and operable to:
   receive packets in a traffic flow;
   perform cardinality estimation on the received packet traffic flow using a sliding HyperLogLog (HLL) process that determines a cardinality of defined classes of HTTP traffic at a prescribed time period regarding the received packet traffic flows;
   maintain in the storage repository a series of cardinalities for prior packet traffic flows;
   detect changes in cardinalities associated with prior packet traffic flows compared to determined cardinalities associated with a current packet traffic flow; and
   determine an alert condition for the network traffic flow regarding a suspected DoS attack based upon the detected changes in cardinalities regarding comparison of the cardinalities associated with prior packet traffic flows compared to cardinalities of a current packet traffic flow and determining if a determined cardinality associated with packet traffic flows currently received is greater than a calculated geometric mean cardinality of past cardinality values by a prescribed 'n' geometric standard deviation of cardinalities.

8. The monitoring system of claim 7, wherein the HLL process includes a sliding window process.

9. The monitoring system of claim 7, wherein determining an alert condition further includes
   cause a mitigation system operable to monitor received packets to enter a first state for determining a DoS attack when the determined cardinality values associated with packet traffic flows currently received is determined greater than the calculated geometric mean cardinality associated with previous received traffic flows by a prescribed 'n' geometric standard deviation of cardinalities.

10. The monitoring system of claim 9, wherein determining an alert condition further includes:
    determine if a determined cardinality values associated with packet traffic flows currently received is greater than a calculated geometric mean cardinality of past cardinality values by a '2n' geometric standard deviation of cardinalities; and
    cause the mitigation system to enter a second state operable to conduct predefined mitigation actions to prevent a DoS attack when the cardinality values associated with packet traffic flows currently received is determined greater than the calculated geometric mean cardinality of past cardinality values by a '2n' geometric standard deviation of cardinalities.

11. The monitor system of claim 9, wherein the mitigation actions to prevent a denial of service attack consist of: rate-limiting the traffic; discarding packets from the traffic;

and performing deep packet inspection (DPI) on all or a subset of packets in the received traffic.

\* \* \* \* \*